United States Patent [19]
Smith, deceased

[11] 3,774,646
[45] Nov. 27, 1973

[54] LINE STOPPING ASSEMBLY USING AN INFLATABLE ELEMENT

[75] Inventor: John J. Smith, deceased, late of Decatur, Ill. Beatrice A. Smith, executrix

[73] Assignee: Mueller Co., Decatur, Ill.

[22] Filed: Nov. 24, 1971

[21] Appl. No.: 201,845

[52] U.S. Cl. .................................... 138/93, 138/94
[51] Int. Cl. ............................................. F16l 55/12
[58] Field of Search ................................ 138/93, 94

[56] References Cited
UNITED STATES PATENTS

| | | | |
|---|---|---|---|
| 2,927,609 | 3/1960 | Vanderlans | 138/94 X |
| 3,025,885 | 3/1962 | VerNooy | 138/94 |
| 3,626,475 | 12/1971 | Hicks | 138/94 |
| 3,665,966 | 5/1972 | VerNooy | 138/94 X |

Primary Examiner—Charles A. Ruehl
Attorney—John W. Malley et al.

[57] ABSTRACT

The disclosure embraces an apparatus for plugging a fluid conduit in which a lateral opening has been formed, the apparatus having a fitting adapted to be secured over the opening in the conduit and in which a carrier member is threadedly supported; a plug element having an inflatable member is pivotally attached to a support arm that projects through the opening in the conduit when the carrier member is installed in the fitting and a manually operable linkage arm is attached at one end to the plug element with the other end of the linkage arm extending through the carrier member exteriorly thereof; fluid passages are provided in the carrier member and plug element to permit supply of a gas under pressure to an exhaust from the inflatable member.

8 Claims, 3 Drawing Figures

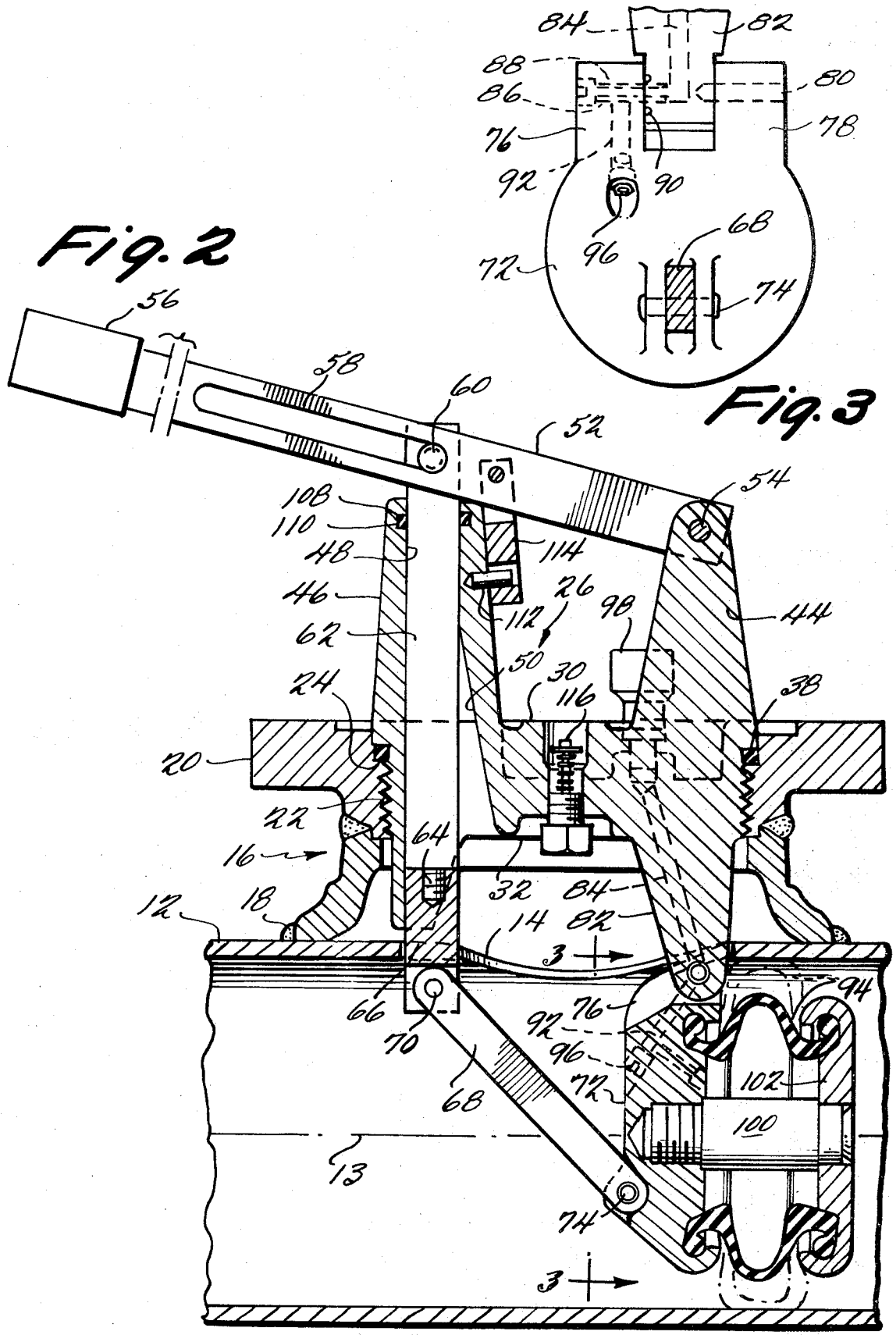

LINE STOPPING ASSEMBLY USING AN INFLATABLE ELEMENT

BACKGROUND AND BRIEF DESCRIPTION OF THE INVENTION

The present invention relates to pluggers for fluid pipelines and, more specifically, to a plugging apparatus of the type that is manually operated and which employs an annularly shaped inflatable member to stop fluid flow in a line.

The necessity of stopping fluid flow in a conduit most often arises as a result of the need for repairs or for the purpose of extending a line by adding one or more branches thereto so that the location at which a plugging operation is required cannot in practical terms be anticipated with any useful precision when the fluid conduit system is initially installed in the ground. To meet the necessity of plugging a line at a random point, efforts have been directed toward the provision of pipe plugging apparatus which can be operated in cooperation with valved hole cutter fittings thus enabling the plugging of pipes which are conveying a fluid under pressure.

One of the problems encountered in plugging a pipe carrying a pressurized fluid has been the proper positioning of the plug element in the line so as to achieve a good seal. To overcome this problem, it has been the practice to employ in some arrangements relatively rigid or non-expansible plug elements such as those disclosed in U.S. Pat. Nos. 2,906,295, 3,025,885, and 2,886,068 to Ver Nooy. With these and other similar arrangements, the plug element is formed to be of a size approximately the diameter of the pipe to be stopped so that the possibility of incorrectly disposing the plug element will be minimized. It is apparent of course, that, in order to be able to insert such a plug element through the pipe walls, a relatively large diameter cut must be made which frequently renders necessary the installation of reinforcing members about the exterior of the cut out portion of the pipe since such large cuts tend to weaken the normal structural integrity of the pipe.

While the utilization of expansible sealing elements in place of the non-expansible type discussed above has to a large extent eliminated the necessity of installing reinforcing members and thus resulted in time and cost savings, since a significantly smaller opening could be cut in the pipe, attempts to obtain the correct positioning of the expansible type plug in the pipe have not proved satisfactory particularly where the pipe is carrying a pressurized fluid.

One source of difficulty can be seen to reside in the disparity between the sizes of the internal diameter of the pipe and the unexpanded diameter of the plug element which disparity permits the plug element to assume an off-center or other mis-aligned position in the pipe thus increasing the chances of effecting an imperfect seal.

In endeavoring to overcome this problem, the prior art has employed a variety of types of lever arms or articulated linkage arrangements to enable a workman to manipulate the plug element to position it in proper alignment in the pipe so that when the plug is expanded a tight seal will be achieved. Where a pipe to be stopped contains a pressurized fluid, however, many of these prior art arrangements have not been able to be readily adapted to plug such lines since visual observation of the plug has been necessary to enable a workman to manually locate the plug properly in the pipe. Other arrangements have employed cumbersome and costly mechanisms to fit the plug in position, the operation of which consumes an undesirable amount of man-hours.

The improvements of the present invention provide useful solutions to the problems recognized in the prior art as well as advantages which assure the obtaining of an excellent fluid tight seal upon each operation of the device.

In a preferred embodiment of this invention, a fitting having an interiorly threaded portion is secured by any suitable means about an opening in a conduit. The fitting may, of course, be the base portion of a valved cutter apparatus that has been used to form a lateral opening in the conduit. A plug carrier member is threaded into the fitting and suitable sealing means are provided to prevent the escape of the fluid from the conduit when the carrier member is positioned in the fitting. On its external face, the carrier member is formed with a post which pivotally supports a lever arm at its upper end and an upwardly projecting tubular guide through which is fitted an articulated linkage. The linkage is connected at one end to the lever arm and at its other end, which is disposed on the opposite face of the carrier member, to a disk element used to support an annular, inflatable plug member. The disk element is hinged to a post which projects generally perpendicularly from the internal face of the carrier member to an extent such that when the lever arm is actuated to pivot the disk element about its hinge axis, the inflatable plug member will be positioned substantially concentrically with respect to the axis of the conduit.

The carrier member and disk element are constructed with intercommunicating fluid passages whereby a pressurized fluid such as an inert gas may be supplied to inflate the plug member to seal off flow in the conduit.

One of the principal features of the present invention resides in the provision of a carrier member which is capable of more precisely locating the hinge axis of a disk supporting the plug member so that the plug member can be disposed with great accuracy in its operative position and yet does not require time consuming manual manipulation or visual observation of the plug member in order to achieve a fluid tight seal.

Another advantageous feature which evolves from the above described structure of the carrier member is the capability of employing a smaller diameter plug member which is expansible to plug the conduit thus eliminating the necessity of cutting large diameter openings in the conduit which have resulted in undesirable weakening of the conduits. Additionally, where the pipe to be plugged is located above the surface or only a few feet below the ground, the device of this invention can be installed and operated with a minimum of preparatory work since the device is easily made compatible with conventional pipe hole cutters and extensive excavation about a pipe is not required where the pipe is buried.

The foregoing and other features and advantages will become apparent in the more detailed discussion which follows and, in that discussion, reference will be made to the accompanying drawings.

BRIEF DESCRIPTION OF THE DRAWINGS

FIG. 2 is a side view in cross-section of the stopper of FIG. 1 shown in its operating position; and FIG. 3 is a view taken along lines 3—3 of FIG. 2.

DETAILED DESCRIPTION OF THE INVENTION

Figure 1:
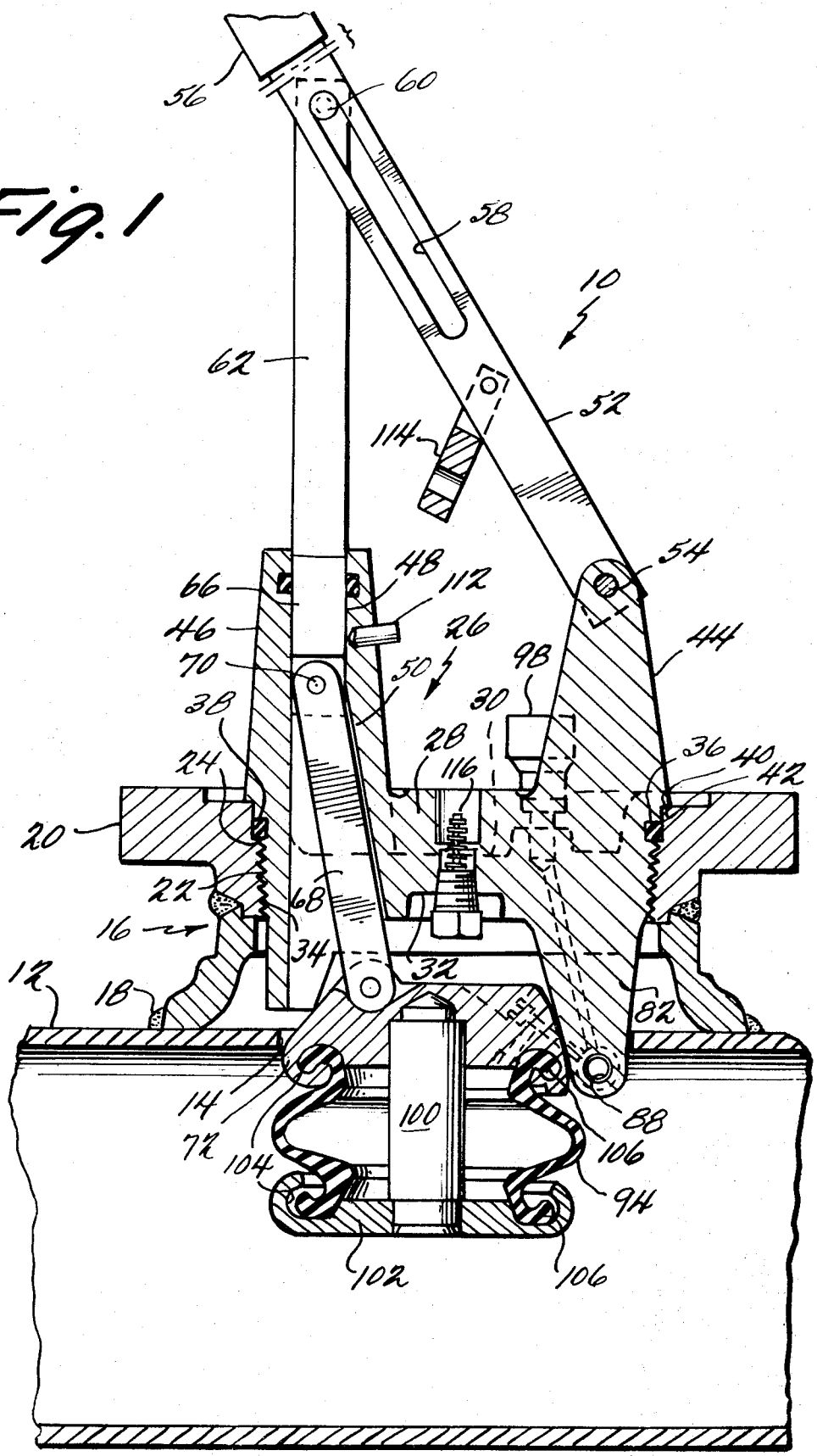
FIG. 1 is a side view in cross-section of the line stopper of the present invention shown in its inoperative position.

Referring now to the drawings wherein like numerals designate corresponding parts throughout the several views, there is shown in FIG. 1 the line stopping apparatus 10 of the present invention mounted on a pipe 12. When the pipe 12 is not carrying a fluid under pressure, a generally circular opening 14 may be cut by conventional equipment in the pipe 12 and a fitting 16 secured about the opening 14 as by welding indicated at 18. Alternatively, where the conduit 12 is carrying a fluid under pressure, a valved fitting such as that disclosed in co-pending U.S. application of Narayan C. Saha and Joseph L. Daghe, Ser. No. 195,561, filed Nov. 4, 1971, and entitled LINE STOPPING ASSEMBLY USING AN INFLATABLE ELEMENT, may be employed so that the apparatus 10 of the present invention may be secured in the position illustrated while the pressurized fluid is prevented from escaping. In this latter circumstance, the fitting 16 may be constituted by the lower portion of the valved cutter device which is removed from the flange 20 subsequent to the installation of the plugging apparatus 10. It will be understood that the flange 20 is provided with suitable threaded bores (not shown) for receiving bolts to attach the valved cutter device as is conventional. The interior of the fitting 16 is provided with a threaded counterbore 22 having an annular shoulder 24 formed to face in a direction opposite to the side of the fitting that is attached to the pipe 12.

The plugging apparatus of the present invention consists of a carrier member 26 which, in one embodiment, is a disk 28 having oppositely disposed faces 30 and 32. The side surface of disk 28 is threaded as at 34 to cooperate with the threaded counterbore 22 and an annular groove 36 is formed about the circumference of the disk 28 to support a deformable O-ring 38.

With the carrier member 26 installed as illustrated in FIG. 1, the O-ring 38 will be compressed on shoulder 24 of fitting 16 to an extent limited by the engagement of a radial shoulder 40 with the radial surface 42 of the fitting 16.

Formed integrally with the disk 28 is a post 44 which projects substantially perpendicularly from the face 30 of the disk 28. In a preferred embodiment, the post 44 is located adjacent the outer edge of the face 30. A hollow tubular guide 46 is formed diametrically opposite to the post 44 and projects substantially perpendicularly from face 30. The guide 46 is formed with a bore 48 the upper portion of which is subsantially cylindrical while the lower portion thereof has a wall portion 50 which diverges outwardly from the center axis of the bore 48.

A lever arm 52 which, if desired, may be bifurcated is pivotally mounted on a pin 54 which is removably secured in the upper end of post 44. The end of lever arm 52 opposite its pivot mounting is provided with a handle 56 to facilitate manual actuation of the lever arm. A slot 58 is formed to extend a portion of the length of the lever arm 52 and in which is located a pin 60 which, in turn, is rigidly attached to the upper end of a shaft 62.

The lower end of shaft 62 has a threaded bolt 64 secured thereto or formed integrally therewith which in turn is threaded into a bore in a block 66. With this arrangement, subsequent to the completion of the plugging of the pipe 12, the shaft 62 and lever arm 52 may be removed.

The lower end of block 66 has linkage arm 68 pivotally attached thereto as by pin 70. The end of arm 68 opposite the pin 70 is pivotally mounted in a similar manner to a plug supporting disk 72 by pin 74.

As shown more clearly in FIG. 3, disk 72 is formed with a pair of spaced ears 76 and 78. Ear 78 is provided with a pin 80 which projects through the ear into a cavity formed in the lower portion of a post 82 which depends from face 32 of carrier member 26 in a sense opposite to post 44. A fluid passage 84 is formed in the carrier member 26 to extend from the surface 30 through post 82 to communicate with a bore 86 formed in ear 76. A hollow rigid tube or roll pin extends through bore 86 into a portion of the fluid passage 84 which serves to support ear 76 to maintain it in alignment with the axis of pin 80. An O-ring seal 90 may be provided about the communication between the bore 86 and fluid passage 84 to prevent the escape of pressurized fluid between the interface of ear 76 and the lower end of post 82. Hollow tube 88 may be provided with an aperture or slot in its wall to permit fluid communication with the passage 92 in disk 72 which is employed to supply fluid under pressure to an inflatable annular plug element 94. Passage 92 has a portion which opens on the face of disk 72 opposite plug 94 and which is provided with a stopper 96. Prior to installation of the carrier member 26, stopper 96 may be removed and the fluid passages 84 and 92 flushed by passing pressurized fluid therethrough. The upper end of passage 84 is fitted with a conventional connector 98 which preferably is of the type having a one-way check valve therein so that a fluid pressure hose can be connected to connector 98 to supply fluid under pressure to the plug 94 through passages 84 and 92.

A support stud 100 is threaddedly mounted in a threaded bore formed in the center of disk 72 and at its opposite end has a disk 102 secured thereto as by welding or other suitable means. Both disks 72 and 102 are formed with annular grooves 104. The plug element 94 is formed with enlarged lip portions 106 on its opposite ends and which are of annular form to interengage with the grooves 104 so that when the plug element 94 is in its relaxed condition, it will be retained between the disk element 72 and 102.

The material from which the plug element 94 is constructed will, of course, depend upon the type of fluid that is being conveyed in the conduit 12. For example, where the fluid is natural gas, the plug element 94 may be constructed from rubber but where the fluid is sewage, the plug element should be constructed from a plastic material that is resistant to corrosion.

In operation, the carrier member 26 is threaded into the fitting 16 to an extent sufficient to compress O-ring seal 38 an to locate lever arm 52 in a vertical plane that passes through the longitudinal axis of the conduit 12. Thus, when the lever arm 52 is removed from its deactuated position as illustrated in FIG. 1 to its actuated postiion as illustrated in FIG. 2, disk 72 will be moved to a position wherein supporting stud 100 will lie along an axis substantially coincident with the longitudinal axis 13 of the conduit 12. The ring shaped plug element 94 then will be in a position so that it may be expanded along radii that extend generally perpendicularly to the longitudinal axis of the conduit 12.

Suitable sealing means such as an O-ring 108 which is seated in a groove 110 formed about the interior bore 48 of guide 46 are provided to assure that pressurized fluid does not escape from the conduit 12 during the plugging operation. Also, a pin 112 is rigidly fixed in guide 46 to cooperate with a detent member 114 which is hinged to lever arm 52 whereby the disk 72 may be maintained in its actuated position as illustrated in FIG. 2 while fluid pressure is supplied to connector 98, passages 84 and 92 to the plug element 94. When the plug 94 is fully inflated, it will assume the dotted line position illustrated in FIG. 2. Subsequent to the plugging of the conduit 12, an equalizing valve 116 is located in disk 28 of the carrier 26 may be actuated to relieve fluid pressure from the downstream side of the plug 94. Once the plug element 94 is inflated, the lever arm 52 and shaft 62 may be removed, if desired.

The respective fittings, carrier member and disks may be constructed from cast metal as is conventional in this art and in a manner that will be readily understood by those skilled therein. As previously discussed, the plugging apparatus of the present invention permits very precise location of the plugging element so that a fluid type seal will be achieved where visual observation of the plugging element is not possible and where manual manipulation of the plugging element itself is difficult. It will be understood, of course, that the present invention is capable of numerous modifications as will be obvious to those skilled in this art and such modifications are intended to be included within the scope of this invention as defined in the appended claims.

What is claimed is:

1. A pipe plugging assembly for use with a fitting secured to a pipe and surrounding a lateral opening in the pipe, the fitting having an open end aligned with the pipe opening, said assembly comprising:
   a carrier member having means for sealingly closing the open end of the fitting including oppositely facing first and second surfaces,
   actuating means movable between actuated and deactuated positions,
   means disposed on said first surface of said carrier member for movably supporting said actuating means,
   an expansible pipe stopping element;
   support means for said pipe stopping element,
   means disposed on said second surface of said carrier member for pivotally mounting in a predetermined position relative to the opening in the pipe said support means for said pipe stopping element for pivotal movement between a retracted position and an operating position,
   said assembly having fluid passage means for supplying a fluid under pressure to said expansible pipe stopping element,
   said carrier member having a passage formed therethrough extending between said first and second surfaces,
   linkage means movably mounted in and extending through said passage in said carrier member for interconnecting said actuating means and said support means for said pipe stopping element so that, when said actuating means is moved from said deactuated position to said actuated position, said support means will be moved from said retracted position to said operating position.

2. The pipe plugging assembly as claimed in claim 1 wherein said actuating means comprises a lever arm and said means for movably supporting said actuating means comprises a post extending generally perpendicularly from said first surface of said carrier member, said lever arm having one end pivotally mounted on said post.

3. The pipe plugging assembly as claimed in claim 1 wherein said support means for said pipe stopping element comprises a pair of disks and a connecting member interconnecting said disks in fixed spaced apart relation to one another and said expansible pipe stopping element comprising a flexible ring-shaped annulus having spaced apart annular surfaces, each of said annular surfaces engaging and being supported by one of said disks, a first one of said disks being pivotally mounted on said means disposed on said second surface of said carrier member.

4. The pipe plugging assembly as claimed in claim 3 wherein said means disposed on said second surface of said carrier member for pivotally mounting said support means for said stopping element comprises a post formed integrally with said second surface and extending generally perpendicularly therefrom.

5. The pipe plugging assembly as claimed in claim 4 wherein said fluid passage means comprises a bore formed in said carrier member and extending from said first surface through said post extending generally perpendicularly from said second surface and communicating with a fluid passage formed in said first one of said disks, said passage in said first one of said disks opening onto the space defined by the interior of said flexible annulus.

6. The pipe plugging assembly as claimed in claim 1 wherein said linking means includes an elongated shaft having spaced apart ends, one of said ends being connected to said actuating means, the other end of said shaft being connected to said support means for said pipe stopping element through an arm having one end pivotally connected to said other end of said shaft and the other end of said arm being pivotally connected to said supporting means.

7. The pipe plugging assembly as claimed in claim 6 wherein said first surface of said carrier member has a tubular guide formed integrally therewith and extending generally perpendicularly therefrom about said passage formed through said carrier member, said shaft being located in said tubular guide and movable relative thereto, said tubular guide having an interior surface, an annular groove formed in said interior surface, and sealing means carried in said groove in sealing engagement with said shaft.

8. The pipe plugging assembly as claimed in claim 1 including locking means for retaining said actuating means in said actuated position.

* * * * *